Aug. 27, 1963    H. A. ARMAND ET AL    3,101,555
CURVE PLOTTER
Filed Sept. 27, 1960    5 Sheets-Sheet 1

INVENTORS
HAROLD A. ARMAND
WILLIAM E. GILCHRIST
EDWIN G. MILLIS
PERRY E. WESTMORELAND
BY *Stevens, Davis, Miller & Mosher*
ATTORNEYS

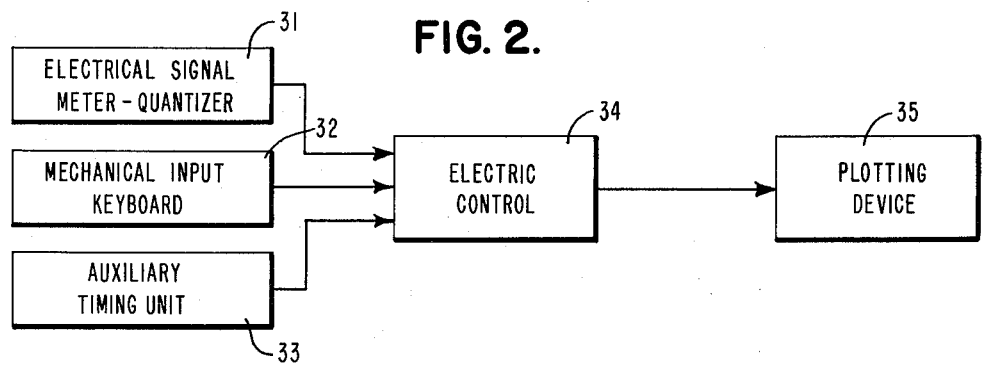
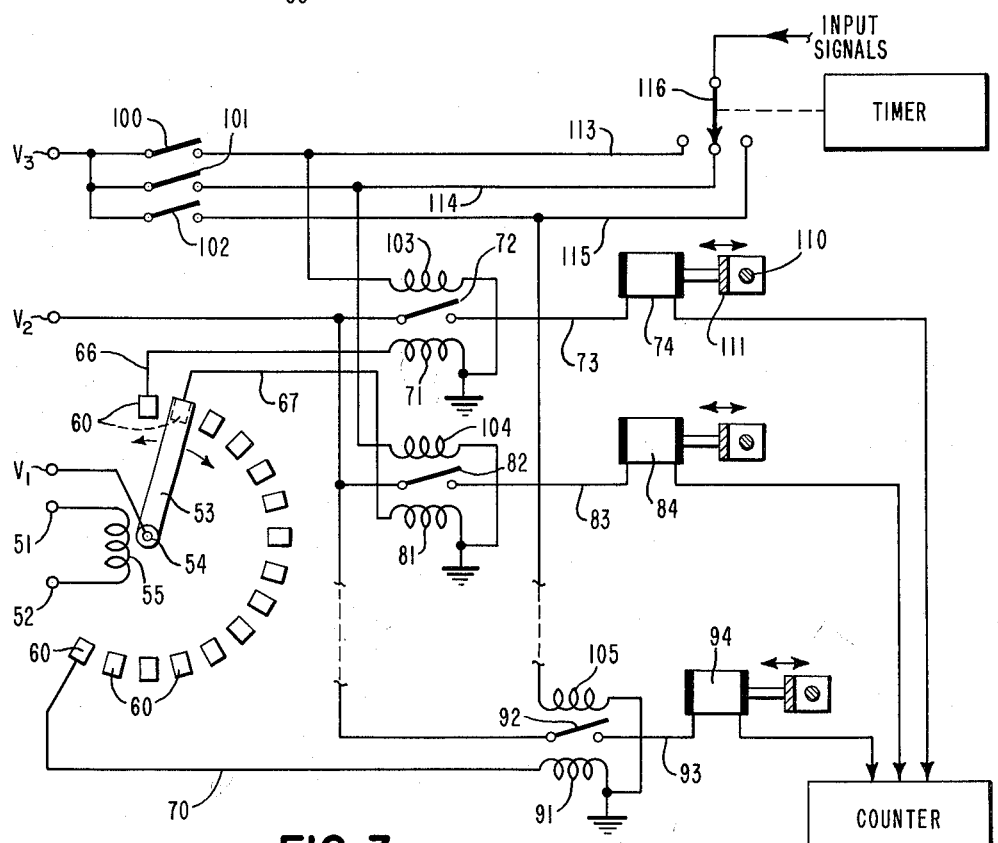

Aug. 27, 1963  H. A. ARMAND ET AL  3,101,555
CURVE PLOTTER
Filed Sept. 27, 1960  5 Sheets-Sheet 3

INVENTORS
HAROLD A. ARMAND
WILLIAM E. GILCHRIST
EDWIN G. MILLIS
PERRY E. WESTMORELAND
BY Stevens, Davis, Miller & Mosher
ATTORNEYS Aug. 27, 1963   H. A. ARMAND ET AL   3,101,555
CURVE PLOTTER
Filed Sept. 27, 1960   5 Sheets-Sheet 4
FIG. 6.
FIG. 10.
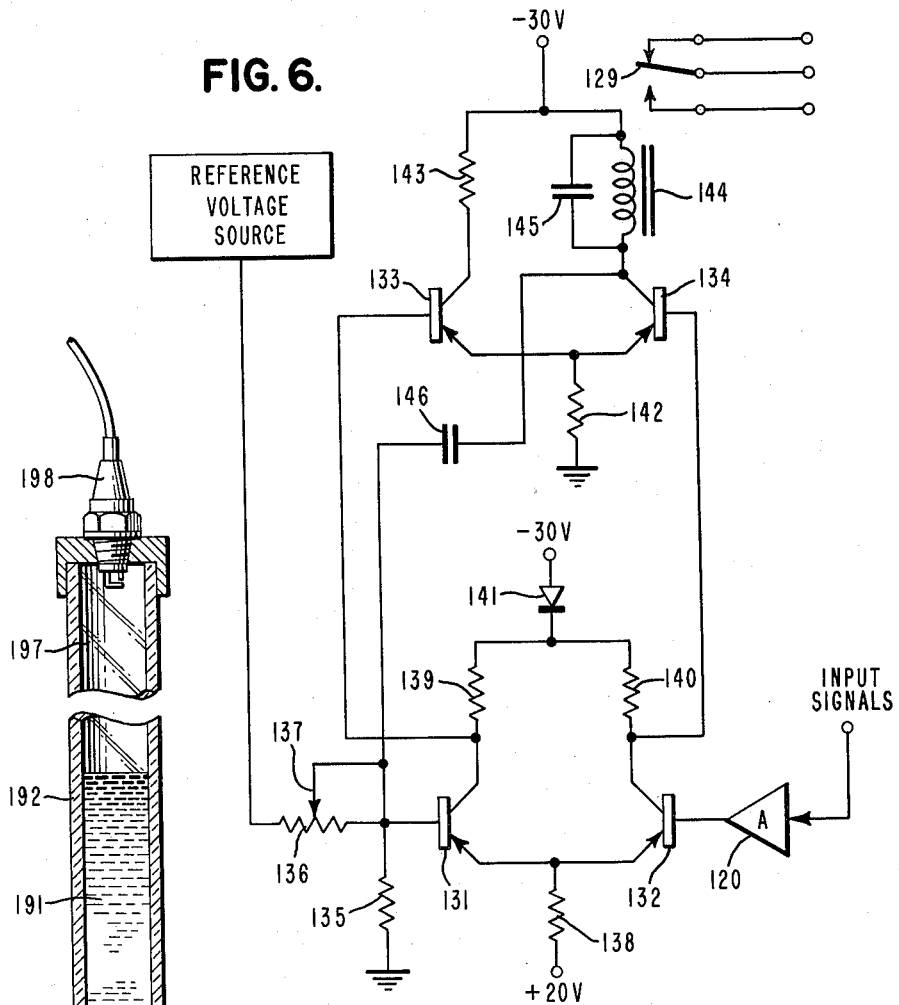
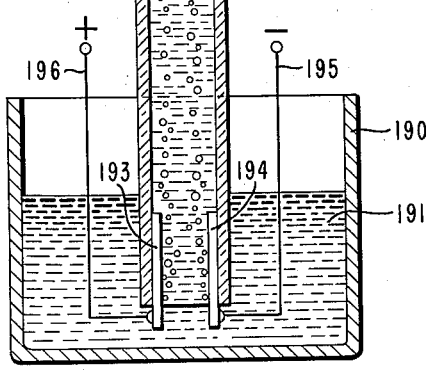
INVENTORS
HAROLD A. ARMAND
WILLIAM E. GILCHRIST
EDWIN G. MILLIS
PERRY E. WESTMORELAND
BY Stevens, Davis, Miller & Mosher
ATTORNEYS

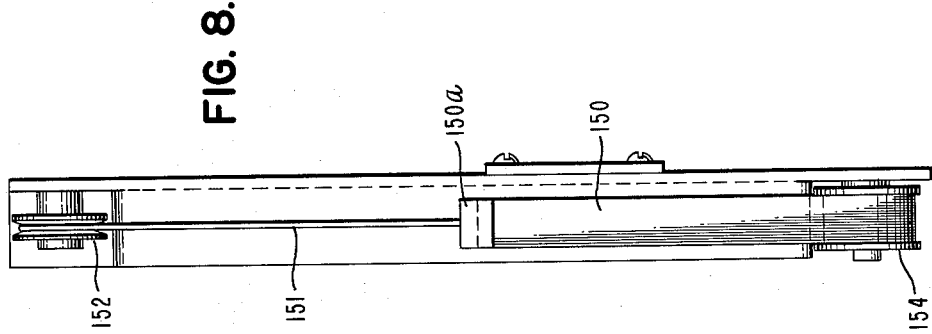
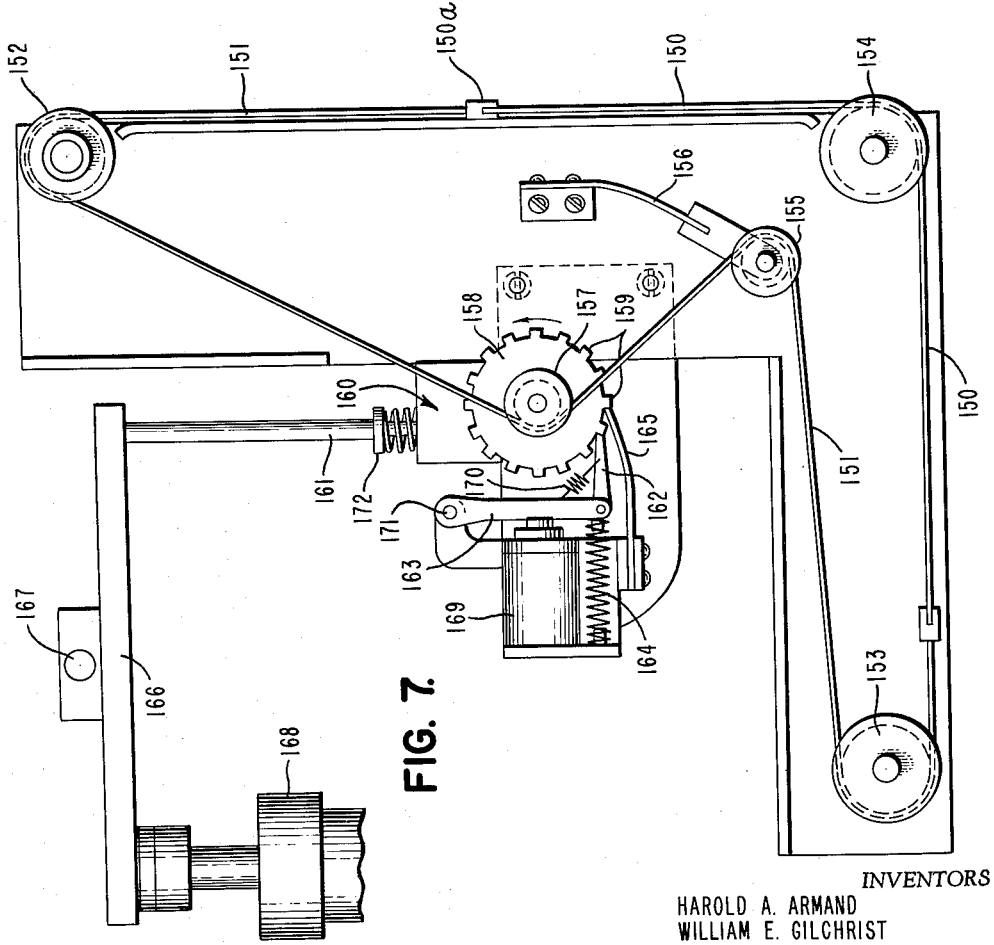

United States Patent Office 3,101,555
Patented Aug. 27, 1963

3,101,555
CURVE PLOTTER
Harold A. Armand, 11426 Mullins Drive, William E. Gilchrist, 6927 Carvel Lane, Edwin G. Millis, 5027 Creekbend, and Perry E. Westmoreland, 6231 Grovewood, all of Houston, Tex.
Filed Sept. 27, 1960, Ser. No. 58,755
2 Claims. (Cl. 35—24)

The present invention relates to the formation and display of distribution or other statistical curves, and more particularly relates to a device for automatically plotting and visually displaying a statistical curve of a particular electrical or mechanical parameter for a large number of parameter readings.

There has been a vast increase in the use and importance of statistical methods in present society. One statistical technique which has found considerable application in fields ranging from engineering to education is the distribution curve in which test scores or readings, are grouped into brackets, and the number of readings falling in each bracket are counted. The distribution curve information may be used to provide data for determining the mean, median and standard deviation of a set of test results.

One field in particular in which the distribution curve can be advantageously and conveniently used is the electronic industry. For example, a large number of electronic devices such as transistors may be put through a given test or series of tests to determine, for example, the amount of cut-off current flowing between the collector and base. The value of cut-off current will, of course, vary from transistor to transistor, and it is highly desirable to know the percentages of transistors produced in a given batch which fall into particular ranges of $I_{CBO}$.

Another use for the distribution curve is in the field of education, where for example, a thousand individuals were given a particular test and it is desired to know the percentages of persons scoring between 95–100, 90–95, 85–90, 80–85, etc. for purposes of analysis. The distribution curve is a simple, convenient, and informative way to display the test results.

It is, therefore, a principal object of the present invention to provide means for automatically forming and visually displaying a statistical curve, such as a distribution curve, from a large number of test readings.

It is a further object of the present invention to provide a statistical curve calculator and plotter which may be used to automatically determine the statistical curve from a series of electrical input readings or which may be equally well adapted to form and display a statistical curve from a series of mechanical inputs.

It is a still further object of the present invention to provide a device for automatically forming a statistical curve from a large number of test readings which will "build up" the curve as more and more readings are applied to the device, and which device is provided with means to facilitate the transfer of the curve to a piece of paper upon the completion of the test in order to provide a permanent record of the curve.

It is a still further object of the present invention to provide a device for plotting a statistical curve on a time base scale.

Other and further objects, advantages, and charcteristic features of the present invention will become readily apparent from the following detailed description of preferred embodiments of the invention when taken in conjunction with the appended drawings in which:

FIGURE 2 is a system block diagram of the apparatus of FIGURE 1;

FIGURE 3 is a partial block and partial schematic circuit diagram of the system illustrated in FIGURE 2;

FIGURE 6 is a schematic circuit diagram of a typical discriminator circuit of FIGURE 5;

FIGURE 7 is a side view of the actual curve forming elements of a typical display bracket in a further embodiment of the present invention;

FIGURE 8 is a front view of the apparatus shown in FIGURE 7;

FIGURE 10 shows a still further type of display column.

Figure 1:
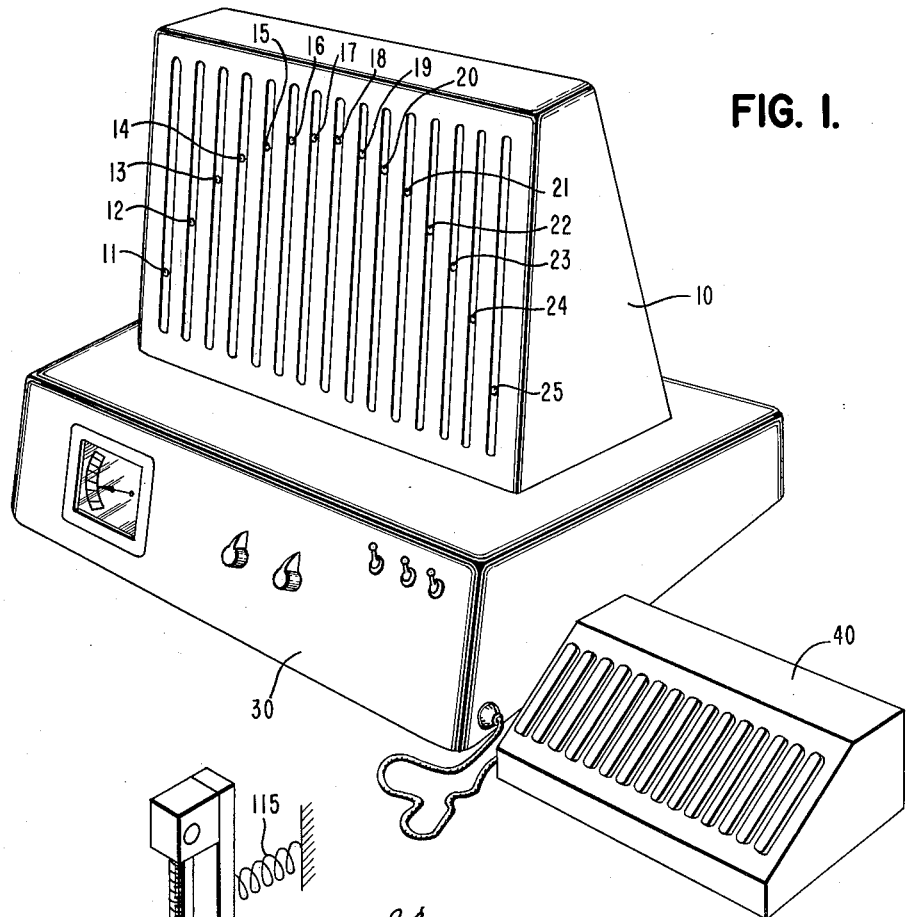
FIGURE 1 is a perspective view of the curve plotting and display apparatus provided according to one embodiment of the invention.

Referring now to FIGURES 1 and 2, the curve plotting apparatus shown therein comprises a curve plotting and display device 10 having a plurality of vertical display columns, each representing a given interval, or bracket, of test values. Although a preferred embodiment of the invention utilizes 15 display intervals, it will be obvious that any number of display columns may be used without departing from the scope of the invention. In FIGURE 1, display indicators 11–25 are known disposed at various vertical positions in the display columns to mark the various points for the curve currently being plotted. The vertical position of each indicator corresponds to the number of test readings in the associated display interval. The curve illustrated in FIGURE 1 is a typical Gaussian distribution in which the greatest number of readings occur near the center of the overall test range, with fewer and fewer readings occurring as the extermities of the test range are approached. The positions of the indicators 11–25 in the display columns are controlled by electrical circuitry located in control box 30.

Referring now to the block diagram of FIGURE 2, three different types of inputs are provided for the curve plotter, one being an electrical analog signal which is measured and then quantized into one of the display brackets by the electrical signal meter-quantizer 31, the second input from a mechanical input keyboard 32, and the third input being applied through an auxiliary timing unit 33 to record the number of inputs occurring in respective time intervals and thereby set up a time scale on the horizontal axis of the curve plotter.

For the time base input a stepping switch is connected to an increment timer which will advance the input one step after a predetermined period of time. The mechanical input keyboard has a plurality of keys, or levers, one for each test bracket. One of the keys is manually pressed each time one reading, or bit of information, is to be fed into that bracket of the curve plotting device associated with the depressed key. The electrical analog signal, which may or may not require amplification, is applied to a meter-quantizer 31, which measures the magnitude of the electrical signal and quantizes it into the appropriate bracket. The output from each of the inputs actuates the electrical control which causes the information to be registered on the plotting device 35.

FIGURE 3 shows the electronic portions of the curve plotting system of FIGURE 2. The analog electrical input signal is applied to the meter-quantizer through input terminals 51 and 52. The meter-quantizer is essentially a D'Arsonval galvanometer having a pointer 53 of electrically conductive material which rotates about a pivot 54 in accordance with the magnitude of the current flowing through galvanometer coil 55. A plurality of spaced printed circuit terminals 60 are located adjacent the tip of the pointer 53. One printed circuit terminal is provided for each quantization bracket; hence, in the preferred embodiment of the invention there are 15 printed circuit contacts for the pointer 53. Each printed circuit contact terminal 60 is connected to a printed conductor. Only 3 such conductors, 66, 67, and 70, are illustrated for simplicity, although it is to be understood that a printed conductor is connected to each contact.

The pointer 53 positions itself over the proper printed contact 60 in response to the analog signal applied to input terminals 51 and 52. A relay-actuated clamper (not shown in the drawings) is located above the pointer, and when actuated, forces the pointer into contact with the printed circuit terminal 60 to close an electrical circuit from bias terminal $V_1$ through one of the printed conductors to ground. The clamper relay is energized automatically by means of an interrogation pulse when the reading is to be taken. The clamper relay is energized a predetermined time after the meter movement is initiated, the predetermined interval of time being sufficient for the needle to come to rest at the appropriate point for the reading then being made.

Each of the conductors feeds a control circuit for one of the quantization columns. The conductor 66, for example, is connected to a relay coil 71 which controls relay arm 72 used to open and close the circuit governing the first quantization column. The circuit controlled by relay arm 72 includes conductor 73 and solenoid 74. Similarly, the conductor 67 is connected to a relay coil 81 which operates relay arm 82 to close the circuit including conductor 83 and solenoid 84. This circuit controls the position of the indicator in the second quantization column. As is also shown in FIGURE 3, the conductor 70 is connected to a coil 91 which operates relay arm 92 to close the circuit comprising conductor 93 and solenoid 94, which circuit controls the fifteenth quantization column. The control circuits for the third through the fourteenth quantization columns are identical to those shown, and are omitted from FIGURE 3 for simplicity.

In FIGURE 3 the pointer 53 on the electrical signal meter-quantizer is illustrated as contacting the printed terminal 60 connected to printed conductor 67. Thus, current flows from bias terminal $V_1$ through the pointer 53, the contact terminal 60, conductor 67 and coil 81 to ground. Current flow through the coil 81 closes relay arm 82 to complete an electrical circuit from terminal $V_2$ through conductor 83 and solenoid 84 to ground. Completion of this circuit activates the indicator in the second quantization column, as will be discussed later with respect to FIGURE 4.

Alternatively, the solenoids 74, 84 and 94 may be activated by mechanical inputs from the keyboard 40 (FIGURE 1), rather than by electrical signals. The respective keys of the keyboard 40 are shown as lever arms 100, 101, and 102 in FIGURE 3. (Only three lever arms have been shown, the remaining twelve being omitted for simplicity.) The lever arms 100, 101, and 102 are connected in circuits comprising relay coils 103, 104, and 105, respectively, which coils control the relay arms 72, 82, and 92, respectively. Thus, when one item of information is to be fed mechanically into the first quantization column, the key 100 would be pressed to complete the electrical circuit from bias terminal $V_3$ through relay coil 103 to ground. This closes the relay contact 72 which completes the electrical circuit including conductor 73 to energize the solenoid 74 of the first quantization column.

When the curve is to be plotted on a time base scale, the auxiliary timing unit is employed. A stepping switch 116, which is driven by an increment timer, is used to feed input signals to the respective circuits associated with the various quantization brackets. Thus, in FIGURE 3 the lead 113 is connected to relay coil 103, the lead 114 is connected to relay coil 104, and the lead 115 is connected to relay coil 105 (the remaining leads again being omitted for simplicity). The increment timer moves the switch arm 116 into contact with one of the terminals for the leads 113-115 and maintains the switch in that position for a given period of time. All the input signals received during that time interval are sent to the associated display column. At the end of the time interval the timer moves the switch arm 116 to contact the next terminal. In FIGURE 3 the timer switch arm 116 is shown connected to the circuit 114, which is associated with the second quantization bracket. The auxiliary timing apparatus thus allows a curve to be formed in which the readings in the brackets indicate the number of input signals received during the respective time intervals. In a preferred embodiment the increment timer can be adjusted to provide time intervals of from 1 to 60 minutes for each of the 15 brackets, thus giving a full scale reading on the curve plotter of from 15 minutes to 15 hours.

Figure 4:
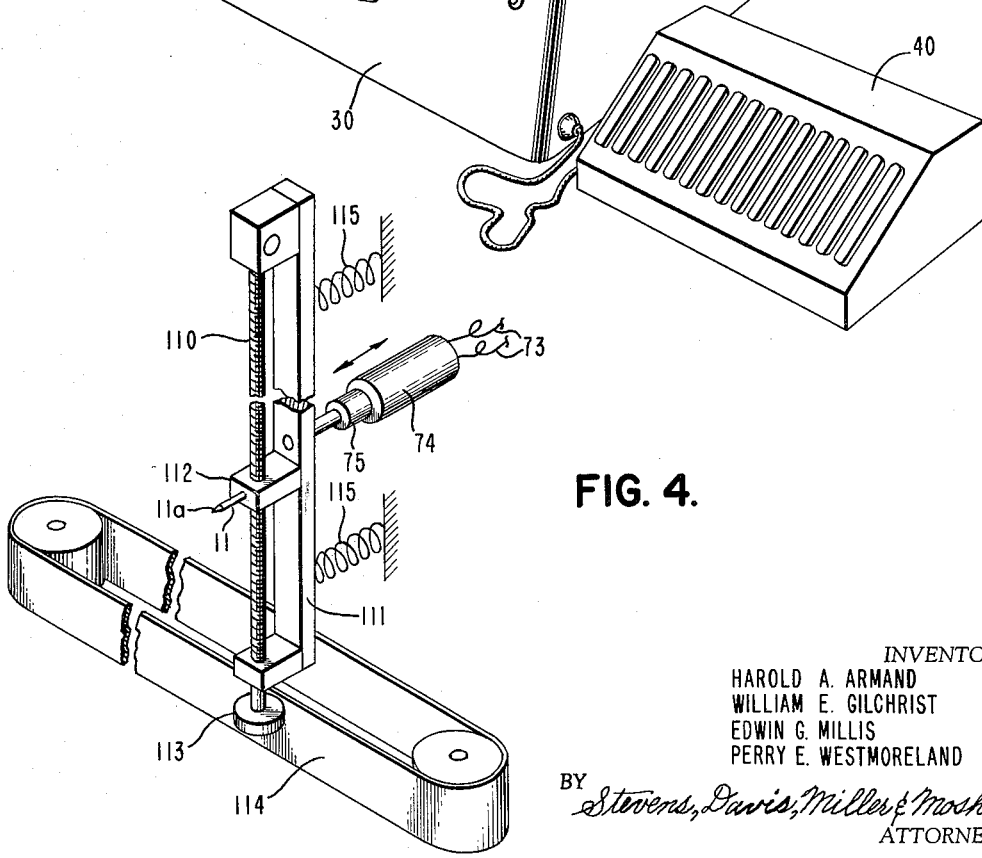
FIGURE 4 is a perspective view of a typical curve plotting and display rack of the curve forming portion of the apparatus of FIGURE 1.

The apparatus used to move one of the indicators 11-25 (FIGURE 1) for a typical quantization column is illustrated in FIGURE 4, the apparatus for each of the remaining fourteen quantization columns being identical to that shown. A lead screw 110 is mounted on a rack 111, and a nut 112 carrying the indicator 11 is mounted on the lead screw 110. The indicator 11 in FIGURE 4 is illustrated as terminating in a point, or needle, 11a which is capable of punching a small hole in a piece of graph paper so that the plotted curve may be readily transferred to the paper in order to obtain a permanent record of the curve. It should be obvious, however, that the indicator need not be a needle but may be any form of indicator, such as a light, or recording device, such as a pencil or pen. A drive wheel 113, which is preferably of rubber but which may also be of other suitable material, is connected to the lower end of the lead screw 110 so that it may engage a movable belt 114. The armature 75 of solenoid 74, which is connected in series with the conductor 73 (FIGURE 3), is attached to the rack 111 so that the drive wheel 113 may be moved into and out of contact with the belt 114 under control of the solenoid 74. Thus, when the solenoid 74 is energized, the rack 111 is pulled back, forcing the drive wheel 113 for the lead screw 110 against the belt 114. Springs 115 are used to maintain the rack 111 and the drive wheel 113 away from the belt 114 when the solenoid 74 is not energized.

During operation of the curve plotting device, the belt 114 is kept in continuous motion by a belt drive motor not shown in the drawings. Each time the relay arm 72 is closed, current will flow through the solenoid 74, and the drive wheel 113 will be forced through the solenoid 74, and the drive wheel 113 will be forced into engagement with the movable belt 114. This causes the nut 112 which carries the indicator 11 to move upward on the lead screw 110 a predetermined amount, thus recording one count, or item of information, in the first quantization column. The drive wheel 113 was held against the moving belt for 0.5 seconds to record one count in a preferred embodiment of the invention. The distance traveled by the nut 112 for each count may be varied by varying the belt speed on the time interval. This allows for a variable vertical (number of units) scale for the statistical curve. The accuracy of the system depends upon a constant belt speed and a sharply defined, uniform time interval.

The lead screws and indicator nuts for the other quantization columns are controlled in the same manner. The height of any nut on a lead screw is a count of the number of units falling into that particular quantization bracket. The arrangement of the fifteen indicator nuts at varying heights on their respective lead screws thus provides a visual picture of the statistical curve (see FIGURE 1).

In the event it is desired to transfer the curve to a piece of paper, either during or at the completion of the formation of the curve, an operator may press the paper against the front face of the curve plotter 10. The indicator points, such as 11a, will punch small holes in the paper according to the positions of the indicator nuts, thus furnishing a permanent record of the curve.

As is shown in FIGURE 3 a counter is provided to count the total number of readings applied to the curve plotter. Thus, each time any of the circuits 73–93 are completed by the closure of relay arms 72–92 respectively, a signal will be sent to the counter to increase its count by unity.

Figures 5, 9:
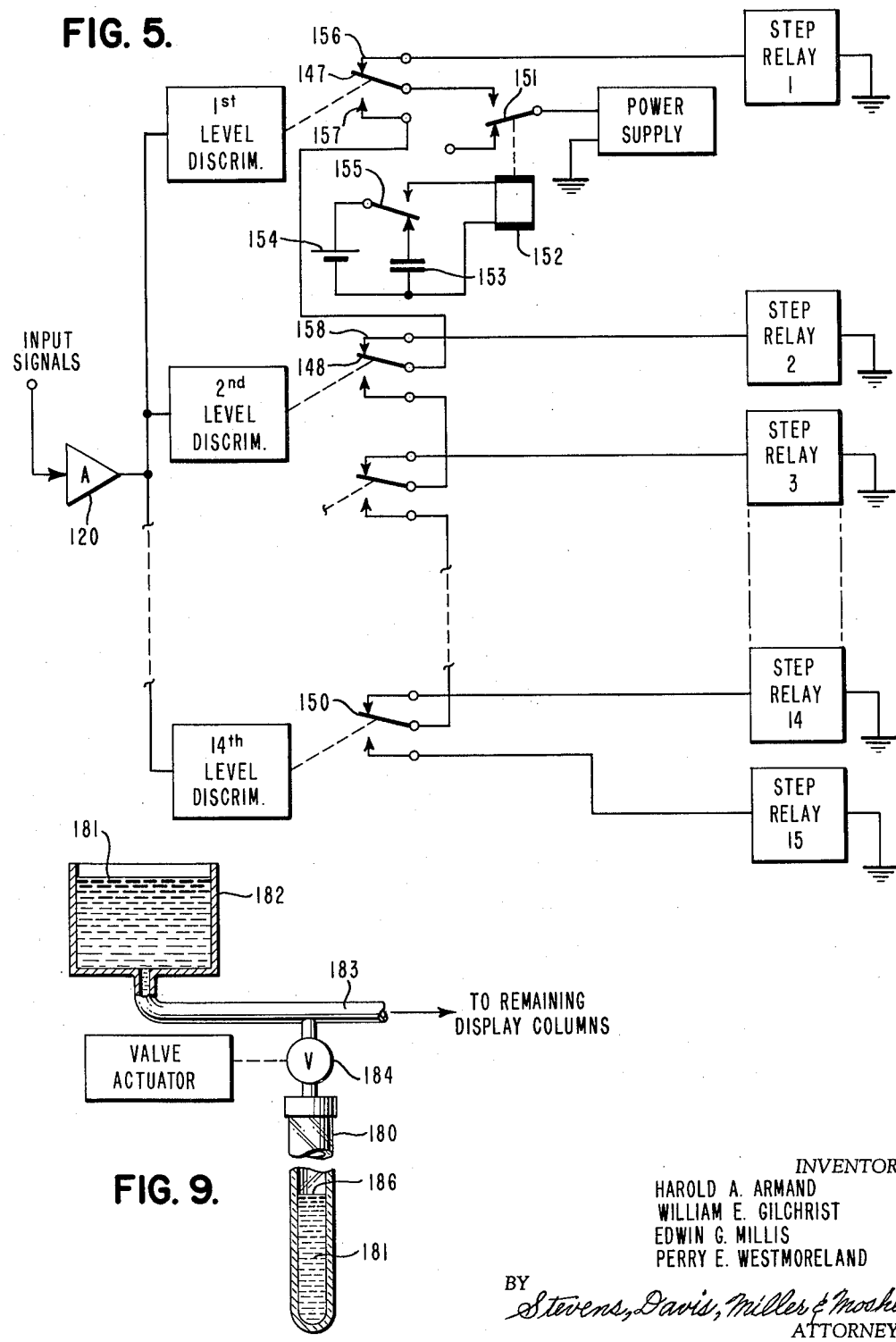
FIGURE 5 is a partial block and partial schematic circuit diagram of the electronic portions of the curve plotting and the display apparatus provided by a second embodiment of the invention.
FIGURE 9 illustrates a further type of display column.

The circuitry used in an alternate embodiment of the present invention is illustrated in FIGURES 5 and 6. In this embodiment the D'Arsonval type meter-quantizer is replaced by a plurality of discriminator circuits connected in parallel and each set to trigger at a different and progressively increased input voltage level in order to sort the analog input signals into the proper quantization brackets. The analog input signals are fed to an amplifier 120, which is preferably a Philbrick USA-3 type amplifier, or any other suitable amplifier having a low output impedance.

The output signals from the amplifier 120 are sent to a series of level discriminators connected in parallel. In order to produce 15 quantization brackets for the display device illustrated in FIGURE 1, 14 level discriminators must be provided. Each level discriminator is set to trigger at a preselected progressively increased value of input voltage. For example, the first discriminator will trigger when the input voltage reaches one volt, the second at two volts, the third at three volts, etc. Thus, the first quantization bracket will contain input signals whose magnitudes are between 0–1 volt, the second signals whose magnitudes are between 1–2 volts, etc., with the fifteenth quantization bracket containing input signals whose magnitudes are above 14 volts.

Thus, in FIGURE 5 the output from the first discriminator controls relay 147, the output from the second discriminator controls relay 148, and the output from the fourteenth discriminator controls relay 150. The relays 147, 148, and 150 are shown in the energized state that exists when discriminations 1, 2 and 14 are not triggered. The arm of relay 147 is connected to one side of power supply, which furnished between 48–50 volts, through a relay sampling switch arm 151. The switch arm 151 is controlled by current flowing through a relay coil 152 having one end connected to a capacitor 153 and the negative terminal of a source of bias potential 154. A switch arm 155 is connected to the positive side of the source 154 and is movable between a first position in which it contacts capacitor 153 and a second position in which it contacts coil 152 to apply the bias from source 154 across the coil 152 and thereby cause current to flow through the coil. This closes the switch arm 151 and thus applies electric current to the arm of relay 147.

When it is desired to record an item of information in the curved plotting device, the switch arm 155 is closed to supply current to the arm of relay 147. Either a push button or a cam driver switch or other means can be used depending upon the requirements. Assume that the input signal received at this time is not strong enough to trigger the first discriminator, i.e. is less than one volt. The relay 147 will remain energized with its arm contacting the upper terminal 156, and power will be applied across Step Relay 1. This will energize Step Relay 1 and cause one bit of information to be placed in the first quantization column. For input signals between 1 and 2 volts the first level discriminator will be triggered and the arm of relay 147 will be made to contact the lower terminal 157 as relay 147 is de-energized, the second level discriminator will not be tripped, and relay 148 will remain in contact with upper terminal 158. This will cause the power supply to apply current to Step Relay 2, and thereby place one item of information in the second quantization column. The remaining relays and contacts at the outputs of the discriminators operate in the same manner. The number of discriminators triggered (and hence the particular step relay energized) is, of course, dependent on the magnitude of the input voltage. The net effect is to quantize the analog input into the appropriate display bracket.

The step relays may be used in the same manner as the solenoids 74–94 of FIGURE 3 to move the respective indicators 11–25 upwards in their quantization brackets. However, in an alternate embodiment of the invention each stepping relay is connected to a rotary stepping motor. The embodiment employing the rotary stepping motors is shown in FIGURES 7 and 8, where there is illustrated the curve forming and indicating apparatus for a typical quantization bracket.

A circuit diagram of a typical discriminator circuit is given in FIGURE 6. The circuit is constructed around a balanced amplifier containing -pnp- transistors 131 and 132 which have their emitters connected together and to a positive bias through a resistor 138. The magnitude of the resistor 138 is varied according to the level at which the discriminator is to be triggered. In a preferred example using a positive bias of +20 volts, for the first level discriminator (assuming that this discriminator is to be triggered at 1 volt) the magnitude of the resistor 138 would be 20K. For a second level discriminator (to be triggered at the 2 volt level) the resistance value would be 21K. For the 14th level discriminator (to be triggered at the 14 volt level) the magnitude of the resistor 138 would be 33K. The collectors of the transistors 131 and 132 are connected through resistors 139 and 140, respectively, to diode 141 which in turn is connected to a negative bias terminal, preferably supplying −30 volts. The input signal from the amplifier 120 is applied to the base of transistor 132, while a reference voltage is applied to the base of transistor 131 through potentiometer 136, the base of transistor 131 being grounded through resistor 135. The collector of transistor 131 is connected to the base of a transistor 133, and similarly the collector of transistor 132 is connected to the base of a transistor 134, the emitters of the transistors 133 and 134 being grounded through resistor 142. The collector of transistor 133 is connected to a negative bias terminal, preferably supplying −30 volts through resistor 143 while the collector of transistor 134 is connected to a relay coil 144. A capacitor 145 is connected across the relay coil 144 to prevent relay chatter due to ripple on the input signal. The collector of transistor 134 is also coupled to the base of transistor 131 by means of capacitor 146. The inclusion of capacitor 146 prevents multivibrating.

In the operation of the discriminator circuit of FIGURE 6, the base of transistor 131 is held at a known voltage, as determined by the reference voltage source, and the setting of tap 137 on potentiometer 136. Since the emitters of transistors 131 and 132 are connected together, they remain at the same potential, and are supplied with essentially a constant current source from the +20 volt supply and the resistor 138. When the base of transistor 132 is at a level corresponding to a signal at the input to amplifier 120 which is below the triggering level for the discriminator, transistor 132 will be cutoff because transistor 131 is conducting (due to the voltage supplied to its base), and the collector of transistor 132 will be at a voltage of about 10 volts more negative than the voltage at the collector of transistor 131. When transistor 131 is conducting and transistor 132 is cut-off, transistor 133 will be cut-off while transistor 134 will conduct. This is because the collector of transistor 131 (and the base of transistor 133) will be at essentially the same voltage as the emitter of transistor 132, while the collector of transistor 132 (and the base of transistor 134) is at a voltage of around 10 volts more negative, which is approximately the potential at the emitters of transistors 133 and 134. When transistor 134 conducts, the current flowing through the relay coil 144 energizes relay 129, which corresponds to the relays 147, 148, and 150 of FIGURE 5.

When the signal from the amplifier 120 which is applied to the base of transistor 132 is at a level corresponding to a signal at the input to amplifier 120 which is above the triggering level for the discriminator, transistor 132 starts to conduct. The current through transistor 132 increases while that of transistor 131 decreases, and eventually transistor 131 becomes cut-off, leaving transistor 132 in the conducting state. The change-over in the conducting states of transistors 131 and 132 will cause a corresponding change in the states of transistors 133 and 134, with transistor 133 now becoming conductive and transistor 134 being cut-off. Under these conditions, no current will flow through the relay coil 144, and the relay 129 will not be energized. When the input voltage to the base of transistor 132 is returned to below the triggering level, the conductive states of the transistors reverse and the relay 129 becomes energized.

With reference to FIGURES 7 and 8, an indicator tape 150 is moved by a string 151 across the front of the curve plotting device to indicate the number of readings in a particular bracket, the vertical position of the upper edge 150a of the tape 150 corresponding to the number of readings received in that bracket. The string is mounted for movement over pulleys 152, 153 and 155, and is connected to the ends of the tape 150 to form therewith a closed loop, the tape 150 being moved over roller 154. The string 151 is also positioned to move over the hub 157 of a ratchet wheel 158 having a plurality of teeth 159. The proper tension in the string is maintained by means of a spring-loaded idler 156 which is connected to the pulley 155.

The ratchet wheel 158 is moved by a drive mechanism 160 having a spring-loaded pawl 162. Spring 170 resiliently biases the pawl 162 against the ratchet wheel 158. The coil 169 of the step relay draws the plate 163 against the coil and compresses the spring 164 when current flows. When the current on the coil is turned off, the compressed spring 164 pushes the pawl 162 against the ratchet wheel 158 and indexes it one tooth in the counterclockwise direction. The leaf spring 165 rides against the ratchet teeth 159 and prevents rotation in the clockwise direction.

To reset the curve plotter, the push rod 161 is depressed. A lug (not shown) on the push rod 161 pushes the pawl 162 and leaf spring 165 down and out of contact with the ratchet wheel. When the pawl 162 and leaf spring 165 are depressed, the ratchet wheel 157 is free to spin, so the tape 150 can be pushed down until 150a is returned to the zero position. This is accomplished by a rake mechanism (not shown) mounted on the front of the curve plotter.

As shown in FIGURE 7, a hydraulic cylinder 168 can be used to reset the plotter. The hydraulic cylinder 168 acts against the lever 166, which is pivotally mounted about the rod 167 forcing the rod 161 down. Once the pressure in the cylinder 168 is released, the spring 172 returns the mechanism to its normal position with the pawl 162 and spring 165 engaging the ratchet wheel 158.

The means which can be used for plotting and displaying the curve are by no means limited to the embodiments shown in FIGURES 1 and 4 or FIGURES 7 and 8. In a further embodiment of the present invention, illustrated in FIGURE 9, each display column comprises a cylindrical tube 180 made of glass, plastic, or other suitable transparent material. The display is formed by allowing a colored fluid 181 to flow into the tube 180 and rise to a level which corresponds to the desired indication. A predetermined and constant amount of fluid is delivered to the tube 180 for each reading received by the apparatus in the associated quantization bracket; hence, the level of the fluid in the tube will indicate the number of readings falling in that bracket. The fluid 181 is delivered to the display tube 180 from a reservoir 182 by means of pipe 183. A normally closed valve 184 is disposed at the top of the tube 180, and when the corresponding solenoid 74—94 of FIGURE 3 (or stepping relay 1–15 of FIGURE 5) is energized due to an input signal received in the associated quantization bracket, the valve 184 is opened for a predetermined amount of time to allow a predetermined unit quantity of fluid to enter the tube 180 and, thus, record one unit of information in the display column. As is shown in FIGURE 9, the level of the fluid 181 in the tube 180 has risen to that indicated by the line 186, which corresponds to a given number of readings received in that particular quantization bracket.

It should be apparent that the remaining display columns are identical to the tube 180 of FIGURE 9, and are all fed with fluid from the reservoir 182 and pipe 183, the valve 184 of each display column being opened only when the received input signal falls into the bracket associated with that display column.

It should also be poined out that the embodiment shown in FIGURE 9 need not be limited to employing a colored fluid, but any other fluent material such as sand, small balls, or any other objects or medium which can be delivered in unit quantities and which will provide an indication may be employed.

In a still further embodiment of the present invention, electrolysis is used to form the display. A typical quantization bracket using the electrolysis display technique is illustrated in FIGURE 10. A tray or beaker 190 is filled with a suitable solution 191, such as water, and a tube 192 is placed so that its open end is immersed in the solution 191, with most of the tube 192 projecting vertically upward from the solution 191. The tube 192 is filled with the solution 191 so that initially the solution level is at the top of the tube 192. Electrodes 193 and 194 are disposed at the bottom (open end) of the tube 192, and are connected to electrical leads 195 and 196, respectively, which in turn are connected to a suitable source of electric current (not shown). The current may be either A.C. or D.C., the only criteria being that it be furnished in discrete and identical amounts.

In the operation of the embodiment of FIGURE 10, when an input signal is received in the quantization bracket corresponding to the tube 192, either the associated stepping relay or the associated solenoid will be energized, which causes that discrete amount of current to flow in the circuit comprising wires 195 and 196 for that amount of time which will correspond to one unit of information. This will cause electrolysis of the solution 191, resulting in a predetermined amount of the solution becoming decomposed into its constituents, hydrogen and oxygen in the case of water. The newly formed gases will rise to the top of the tube 192 and occupy the space designated as 197 in FIGURE 10. The amount of gas formed will be proportional to the number of times the circuit 195—196 is energized, since the same amount of gas is formed for each application of current. Every time the circuit 195—196 is energized, the amount of gas 197 in the tube 192 will increase, and the gas-liquid boundary will move downwardly, thus indicating the number of readings recorded in the associated quantization column. A spark plug 198 is provided at the top of the tube 192 for resetting the apparatus when it is desired to remove the indication, i.e., to return the level of liquid to the top of the tube 192 before the apparatus receives the data for the next curve to be plotted.

Although the present invention has been shown and described with reference to particular embodiments, nevertheless, various changes and modifications obvious to one skilled in the art are deemed to be within the spirit, scope and contemplation of the invention.

What is claimed is:

1. Apparatus for forming and displaying a statistical curve from measurement data to show the relative number of readings falling within respective brackets of the measurement range, said apparatus comprising a plurality of threaded lead screws, each being associated with a particular bracket of the measurement range, a threaded nut mounted on each lead screw for movement along said screw when said screw is rotated, the position of each movable nut on its lead screw representing the number of readings in its associated bracket and the positions of the nuts when taken together defining points bearing a coordinate relationship and being representative of the statistical curve, a drive wheel attached to each lead screw, a movable belt for rotating the drive wheels to cause movement of the respective nuts along their respective lead screws, means for normally maintaining said belt out of contact with said drive wheels, and means for causing said belt to contact the appropriate one of said drive wheels for a predetermined time to cause the nut mounted on the lead screw driven by the said one of said drive wheels to move a predetermined unit distance along the said driven lead screw in response to said apparatus receiving an input signal falling within the bracket associated with said driven lead screw.

2. Apparatus for forming and displaying a statistical curve from measurement data to show the relative number of readings falling within respective brackets of the measurement range, said apparatus comprising a plurality of threaded lead screws, each being associated with a particular bracket of the measurement range, a threaded nut mounted on each lead screw for movement along said screw when said screw is rotated, the position of each movable nut on its lead screw representing the number of readings in its associated bracket and the positions of the nuts when taken together defining points bearing a coordinate relationship and being representative of the statistical curve, a drive wheel attached to each lead screw, a movable belt for rotating the drive wheels to cause movement of the respective nuts along their respective lead screws, means for normally maintaining said belt out of contact with said drive wheels, and means for causing said belt to contact the appropriate one of said drive wheels for a predetermined time to cause the nut mounted on the lead screw driven by the said one of said drive wheels to move a predetermined unit distance along the said driven lead screw in response to said apparatus receiving an input signal falling within the bracket associated with said driven lead screw, said means for causing said belt to contact said drive wheels including means for quantizing an analog electrical input signal received by said apparatus into one of said brackets whereby the appropriate one of said wheels contacts said belt.

References Cited in the file of this patent
UNITED STATES PATENTS

| | | |
|---|---|---|
| 1,790,200 | Davenport | Jan. 27, 1931 |
| 2,212,161 | Kirton | Aug. 20, 1940 |
| 2,390,569 | Ziebolz | Dec. 11, 1945 |
| 2,398,988 | Ziebolz | Apr. 23, 1946 |
| 2,463,763 | Graff | Mar. 8, 1949 |
| 2,484,058 | Steinberger | Oct. 11, 1949 |
| 2,502,707 | Correa | Apr. 4, 1950 |
| 2,537,628 | Hanson et al. | Jan. 9, 1951 |
| 2,567,632 | Bihaly | Sept. 11, 1951 |